United States Patent [19]
Kachi

[11] Patent Number: 5,949,702
[45] Date of Patent: Sep. 7, 1999

[54] MEMORY MOUNTING JUDGMENT CIRCUIT

[75] Inventor: Seiji Kachi, Tokyo, Japan

[73] Assignee: NEC Corporation, Japan

[21] Appl. No.: 09/008,699

[22] Filed: Jan. 19, 1998

[30] Foreign Application Priority Data

Jan. 22, 1997 [JP] Japan .................................. 9-009038

[51] Int. Cl.⁶ ...................................................... G11C 5/06
[52] U.S. Cl. ...................................... 365/63; 365/189.11
[58] Field of Search .................................. 365/63, 189.11

[56] References Cited

U.S. PATENT DOCUMENTS 4,660,999   4/1987   Tsuneki ........................................ 365/63
5,121,483   6/1992   Monahan et al. ........................... 395/275

FOREIGN PATENT DOCUMENTS 1-303692   12/1989   Japan .
3-113543    5/1991   Japan .

Primary Examiner—David Nelms
Assistant Examiner—M. Tran
Attorney, Agent, or Firm—Ostrolenk, Faber, Gerb & Soffen, LLP

[57] ABSTRACT

A memory mounting judgment circuit can improve reliability in detection whether ROM is mounted or not. In response to a power-ON reset signal, a signal from an output terminal of ROM is stored in a data storage portion. By pulling up a signal line electrically connecting the output terminal of ROM and the data storage portion, the signal line when ROM is not mounted, is fixed at all "1". When ROM is mounted, data read out from ROM is stored in the data storage portion. Depending upon the storage content of the data storage portion, judgment whether ROM is mounted or not, is made.

13 Claims, 11 Drawing Sheets

| CLOCK | INPUT | OUTPUT |
|---|---|---|
| 0 | 0 | 0 |
|   | 1 | 1 |
| 1 | 0 | INVARIABLE |
|   | 1 |   |

MEMORY MOUNTING JUDGMENT CIRCUIT

BACKGROUND OF THE INVENTION

1. Field of the Invention

The present invention relates generally to a memory mounting judgment circuit. More specifically, the invention relates to a circuit which makes judgment whether ROM (Read Only Memory) is mounted or not.

2. Description of the Related Art

In general, programmable device or CPU (Central Processing Unit) having a boot function perform predetermined operation with reading out a content stored in ROM upon power-ON reset. Accordingly, in a computer system employing such device or CPU, the system cannot be correctly started up unless ROM is mounted. Therefore, it becomes necessary to automatically check whether ROM is mounted and to mount ROM if not mounted.

A technology for checking whether a parts to be mounted is mounted or not, has been disclosed in Japanese Unexamined Patent Publication (Kokai) No. Heisei 3-113543. Discussion for the prior art will be given with reference to FIGS. 11 and 12.

As shown in FIG. 11, in the prior art disclosed in the above-identified publication, mounting of ROM is checked by employing an optical sensor. Namely, in the condition where ROM 202 is mounted, a light beam emitted from a light emitting device 201 is reflected at the bottom portion of ROM 202. When the reflected light is received, a photosensing element 203 turns ON. In response to turning ON of the photosensing element 203, an output of a comparator 204 becomes HIGH level.

On the other hand, in the condition where ROM 202 is not mounted, the photosensing element 203 may not receive the light from the light emitting device 201. Therefore, the photosensing element 203 is held OFF to make the output of the comparator LOW level. Thus, by means of the optical sensor, check can be performed whether ROM is mounted or not. It should be noted that ROM is mounted in a socket 205 as shown in FIG. 12. And, the light emitting device 201 and the photosensing element 203 are located at the mounted position of the socket 205.

On the other hand, Japanese Unexamined Patent Publication No. Heisei 1-303692 discloses another prior art. The prior art disclosed in this publication will be discussed with reference to FIGS. 13 and 14. In this prior art, as shown in FIG. 13, check is performed whether an IC card 212 is mounted or not by means of a microswitch 211. Namely, when the IC card 212 is not mounted, the microswitch 211 is held OFF, and when the IC card 212 is mounted, the microswitch 211 turns ON. Accordingly, depending upon ON and OFF of the microswitch 211, whether the IC card 212 is mounted or not can be checked.

On the other hand, in the prior art illustrated in FIG. 14, whether the IC card 212 is mounted or not is detected depending upon whether a signal line 222 which is fixed at low level is connected to a RESET signal line 221 which is pulled up to a predetermined level by a pull-up resistor 223. Namely, when the objective device is not mounted, the RESET signal line 221 becomes HIGH level due to presence of the pull-up register 223, and when the IC card 212 is mounted, the RESET signal line 221 is grounded and thus becomes LOW level. Accordingly, whether the IC card 212 is mounted or not can be checked.

In the prior art shown in FIGS. 11 and 12, set forth above, since the optical sensor has to be arranged right below ROM.

In certain shape or size of the ROM socket, the optical sensor may not be arranged at the desired position. Also, since a reflected light of the light emitted from the light emitting device, a certain distance between the light emitting elements and ROM is inherently required. However, in certain kind of socket, the distance becomes zero to make it impossible to receive the reflected light.

On the other hand, in case of the method employing the microswitch as shown in FIG. 13, when it is applied for checking whether ROM is mounted or not, the microswitch has to be located at a position to be turned ON and OFF depending upon presence and absence of ROM to be mounted. This can be significant constraint in mounting. Therefore, such prior art can be impossible to practice in viewpoint of arrangement.

On the other hand, in case of the prior art shown in FIGS. 11 and 12, a space above ROM has to be empty so that the light should not be reflected when ROM is not mounted. If substrate, casing or so forth is present immediately above ROM, erroneous detection of mounting of ROM can be caused by the light reflected by these element. For necessity of providing an empty space above ROM, mounting density can not be increased.

On the other hand, considering the case where the prior art shown in FIG. 14 is employed in checking whether ROM is mounted or not. It becomes necessary to have a pin or pins fixed at low level or pins fixed at high level among pins of ROM. However, a little number of ROMs having the pin or pins fixed at low or high level are available in the market. Accordingly, when checking of mounting of ROM is to be realized by this method, there is no method other than preparation of custom-made ROM. Thus, ROMs available in the market cannot be used freely.

Furthermore, in the prior art shown in FIGS. 11 and 12 set forth above, it is possible to damage the sensor during repeating of mounting and unmounting of ROM. Namely, it is frequently performed to unmount ROMs using principle of leverage by inserting a tool, such as a driver, tweezers or so forth between ROM and the socket upon removal of ROM, in general. In such case, the sensor can be damaged by the tip end of the driver or so forth when the sensor is provided below ROM.

Accordingly, in the prior art set forth above, improvement of reliability in detection of presence or absence of ROM, increasing of package density can be prevented. In the alternative, a problem can be encountered in arrangement.

SUMMARY OF THE INVENTION

The present invention has been worked out for solving the problems encountered in the present invention. It is an object of the present invention to provide a memory mounting judgment circuit which can realize improvement of reliability of detection whether memory is mounted or not, or can realize increasing package density.

According to one aspect of the present invention, a memory mounting judgment circuit comprises:

connecting means having an output terminal electrically connected with a data terminal of a memory when said memory is mounted;

storage means responsive to an external command for storing a signal from said output terminal;

logic fixing means for fixing a logical level of a signal line electrically connecting said output terminal and said storage means at a specific logical level when said memory is not mounted, judgment whether said memory is connected to said connecting means, being made depending upon a storage content of said storage means.

In the shown circuit, in response to the power-ON reset signal, connection between ROM and the external signal line is shut off to take out information of ROM according to an internally generated address. When ROM is mounted, the information written in ROM is readout. When ROM is not mounted, all "1" developed by the pull-up resistor is read out. By writing other than all "1" in the internally generated address, whether ROM is mounted or not, can be judged.

Furthermore, the memory mounting judgment circuit may detect whether ROM is mounted or not by the logical circuit, improvement of reliability in detection whether ROM is mounted or not, can be achieved in comparison with the conventional circuit employing the optical sensor or mechanical sensor. Furthermore, the present invention resolves constraint in arrangement to permit down-sizing and reduction of weight.

According to another aspect of the invention, a memory mounting judgment circuit comprises:

a device having first and second start-up terminals and started up by a start-up signal input to one of said start-up terminals;

connecting means electrically connected to said first start-up terminal and mounting a memory providing data applying said start-up signal to said device upon turning ON of the power source; and a pull-up resistor fixing a signal level transmitting data read out from said memory to said device, at a predetermined logical level, detection whether said memory is mounted or not, being performed depending upon a value of the logical level of said signal line upon starting-up of said device.

According to a further aspect of the invention, a memory mounting judgment circuit comprises:

a device started up by a start-up signal input a start-up terminals;

connecting means electrically connected to said start-up terminal and mounting a memory providing data applying said start-up signal to said device upon turning ON of the power source;

a pull-up resistor fixing a signal level transmitting data read out from said memory to said device, at a predetermined logical level; and notifying means for notifying the logical level of said signal line upon starting up of said device, detection whether said memory is mounted or not, being performed depending upon the content of notice of said notifying means.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

Figure 1:
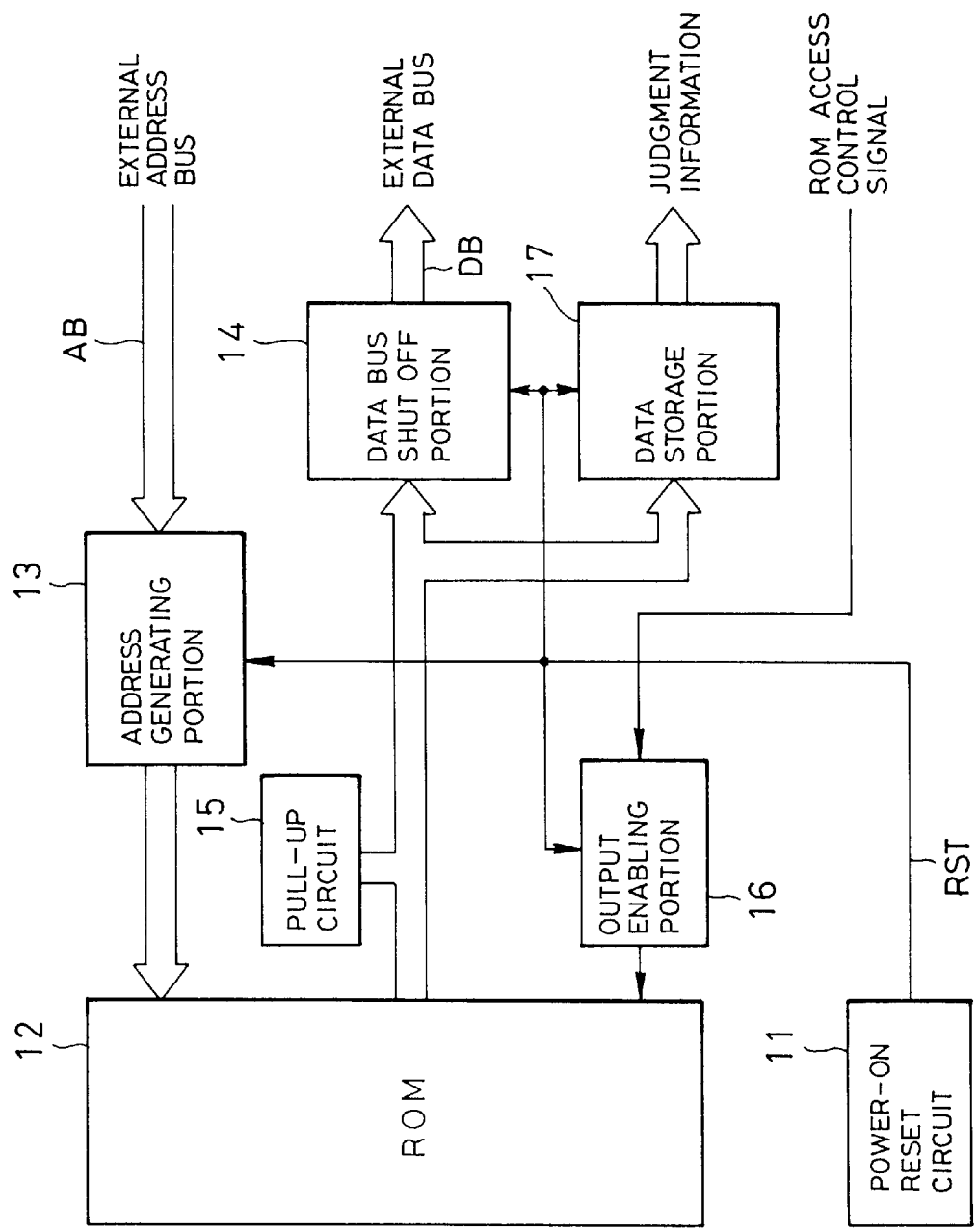
FIG. 1 is a block diagram showing a construction of one embodiment a memory mounting judgment circuit according to the present invention.

FIG. 1 is a block diagram showing a construction of one embodiment a memory mounting judgment circuit according to the present invention. In FIG. 1, the shown embodiment of a memory mounting judgment circuit is a circuit for detecting whether ROM 12 is mounted or not. The memory mounting judgment circuit is constructed with a power-ON reset circuit 11 outputting a reset signal RST upon turning ON of power source of the circuit, an address generating circuit 13 selectively providing a fixed address and an external address to ROM 12 depending upon presence or absence of the reset signal RST, a data bus shut off portion 14 connecting an output terminal of ROM 12 and an external data bus DB only when the reset signal RST is not output, and a data storage portion 17 storing data at an output terminating timing, namely a terminating edge of the reset signal RST.

On the other hand, the shown embodiment of the memory mounting judgment circuit includes a pull-up circuit 15 pulling up a signal line connected to the output terminal of ROM 12 to a predetermined level, and an outputting enabling portion 16 applying a ROM access control signal to ROM 12 only when the reset signal RST is not output.

ROM 12 is general one available from the market and has an address terminal, a data output terminal, a chip enabling terminal and an output enabling terminal which will be discussed later. ROM 12 is electrically connected to a not shown socket. The socket is mounted on a printed circuit board or the like.

It is also possible to directly mount ROM 12 on the printed circuit board or the like, not via the socket. In short, check is performed whether ROM 12 is electrically connected to the shown circuit or not, namely is mounted or not.

The address generating portion 13 applies a fixed address to ROM 12 irrespective of an external address bus AB while a signal (hereinafter referred to as reset signal) indicative of reset condition from the power-ON reset circuit 11 is input. In non-reset condition, the external address AB is applied to ROM 12, as is.

When the data bus shut off portion 14 inputs the reset signal, an external data bus DB is shut off so that an information on the external data bus does not penetrate into ROM 12 side. On the other hand, the data bus shut off portion 14 is connected to the external data bus DB so that normal ROM access can be performed in the non-reset condition.

The output enabling portion 16 applies a ROM access control signal to ROM 12 so that data output of ROM 12 becomes effective while the reset signal is input. On the other hand, the output enabling portion 16 applies the external control signal to ROM as is under the non-reset state. By this, while the power-ON reset circuit 11 is outputting the reset signal, the control signal and the fixed address are applied to ROM so that data output becomes effective. Therefore, ROM 12 outputs data stored in the fixed address to the data bus DB.

The data storage portion 17 latches an information of the data bus output from ROM 12 at the terminating edge of the reset signal. By this, in the condition where the ROM is mounted, the data storage portion 17 stores data of the address generated by the address generating portion 13. On the other hand, when ROM 12 is not mounted, all of signal lines in the data bus DB become logical "1" by a pull-up circuit 15 so that a data storage portion 17 stores all "1". Accordingly, if data stored in the fixed address is not all "1", having information is different whether ROM is mounted or not. Thus, wheter ROM is mounted or not can be identified.

Figure 2:
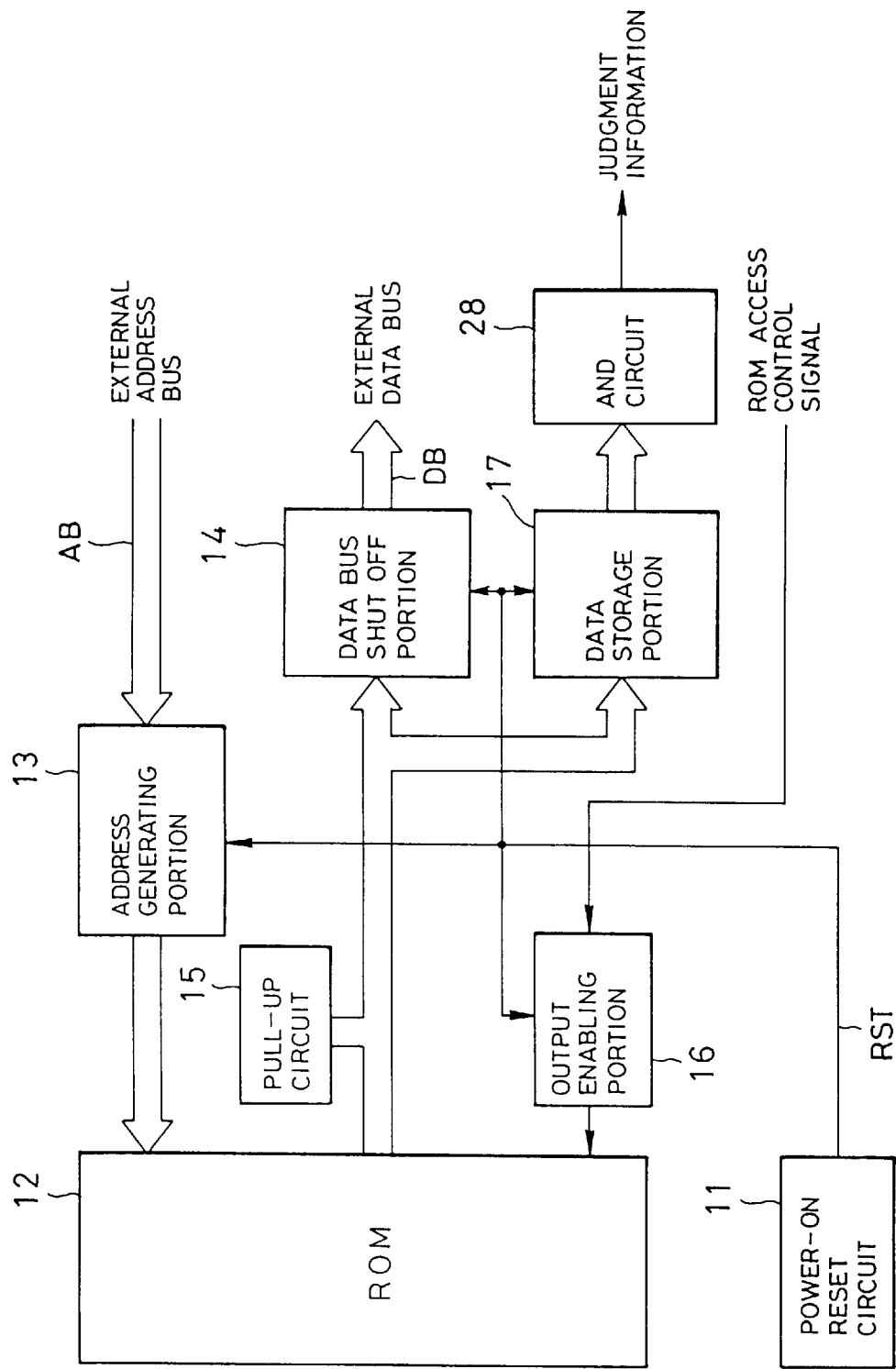
FIG. 2 is a block diagram showing a construction of another embodiment a memory mounting judgment circuit according to the present invention.

FIG. 2 shows another embodiment of the present invention. In FIG. 2, like elements equivalent to those in FIG. 1 will be identified by like reference numerals. In FIG. 2, the shown embodiment is differentiated from the circuit shown in FIG. 1, in that AND circuit 28 is provided. The AND circuit 28 takes an AND of the outputs of the AND circuit 28 to generate a single signal. Accordingly, when ROM 12 is mounted, the data storage portion 17 stores a data having "0" at least in one bit. Thus, AND becomes "0". On the other hand, when ROM 12 is not mounted, data in all bits become "1". Therefore, AND becomes "1". When the output of the AND circuit 28 is "0", ROM 12 is mounted, and when the output of the AND circuit 28 is "1", ROM 12 is not mounted. Thus, according to the result of AND, whether ROM is mounted or not can be identified.

Next, discussion will be given for particular embodiment of the present invention with reference to FIGS. 3 to 8. In FIGS. 3 to 8, like elements equivalent to those in FIGS. 1 and 2 will be identified by like reference numerals to neglect detailed discussion therefor in order to keep the disclosure simple enough with avoiding redundant discussion for facilitating clear understanding of the present invention.

Figure 3:
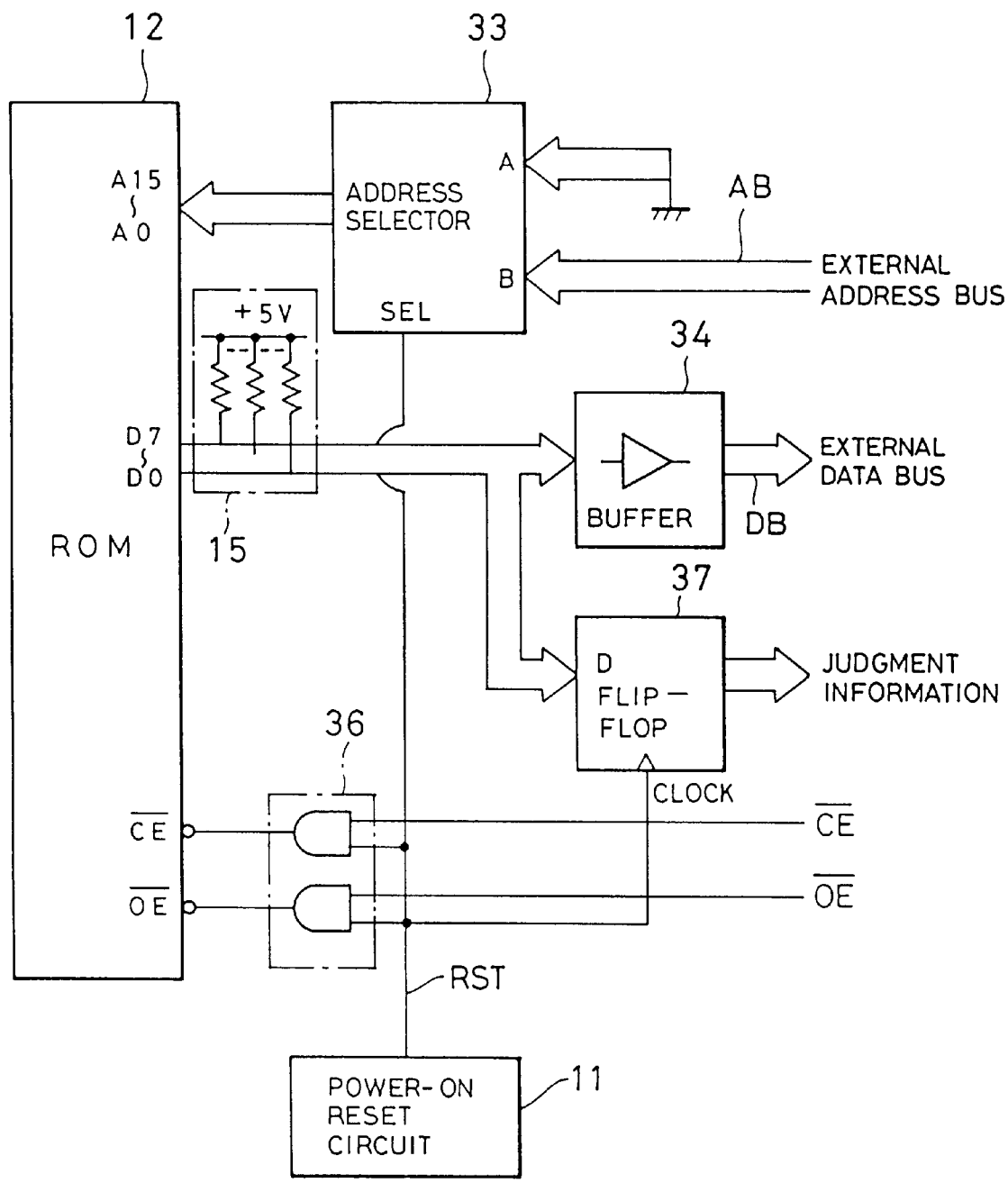
FIG. 3 is a block diagram showing a construction of particular embodiment a memory mounting judgment circuit according to the present invention.
Figure 4:
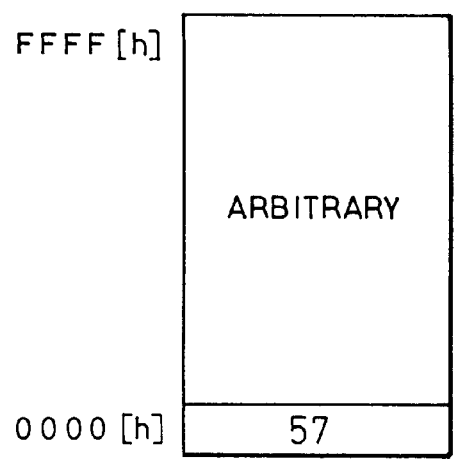
FIG. 4 is an illustration showing a storage content of ROM in FIG. 3.

At first, as shown in FIG. 3, the particular embodiment of the memory mounting judgment circuit according to the present invention is a circuit for making judgment whether ROM 12 is mounted or not. The shown embodiment of the memory mounting judgment circuit includes a power-ON reset circuit 11 outputting a reset signal RST upon turning ON of a power source of the circuit, an address selector 33 selectively applying a fixed address and an external address to ROM 12 depending upon presence or absence of the reset signal, a buffer 34 connecting the output terminal of ROM 12 to the external data bus DB only when the reset signal RST is not output, a D-type flip-flop 37 storing a data at the terminating edge of the reset signal RST, an AND gate 36 applying an external ROM access control signal only when the reset signal RST is not output, and a pull-up circuit 15 pulling up the signal line connected to the output terminal of ROM 12 to a predetermined level. It should be noted that, in the foregoing discussion, ROM having 16 bits of address bus, 8 bits of data bus, CE (chip enabling) bar, OE (output enabling) bar. On the other hand, it is assumed that 57[h] shown in FIG. 4 is written in address 0000[h] of ROM (h is hexadecimal number). Arbitrary number is written in other address.

Figure 5:
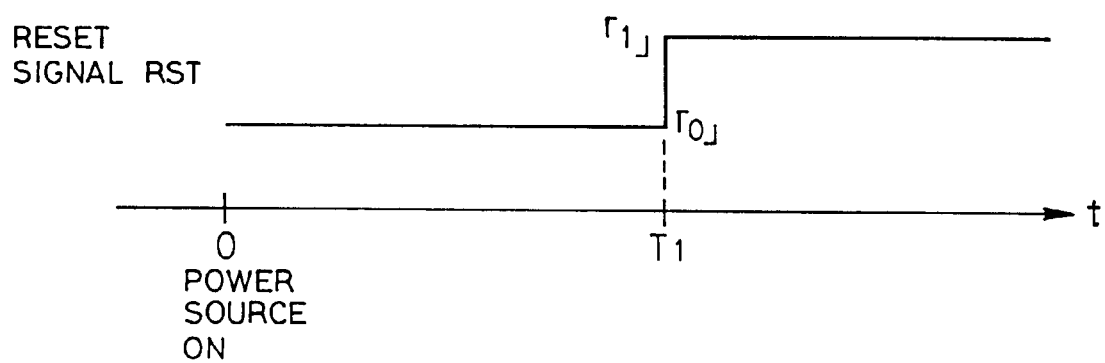
FIG. 5 is a timing chart showing variation of a reset signal in FIG. 3.

The power-ON reset circuit 31 generates the reset signal, shown in FIG. 5. In FIG. 5, the reset signal RST becomes logical "0" for a predetermined period from immediately after turning ON of the power source (from immediately after turning ON of the power source to a timing T1), and subsequently (after the timing T1) becomes logical "1".

Returning to FIG. 3, the address selector 33 selects an address bus A side, which address bus A is connected to the ground (GND) when the reset signal input to a SEL terminal is "0", and selects an external address bus B side when the reset signal is "1". When the reset signal RST is "0", two AND gates 36 apply "0" for the CE bar and OE bar of the terminal of ROM 12. On the other hand, when the reset signal RST is "1", the CE bar and the OE bar are applied externally.

In such construction, when the reset signal RST is "0", address 0000[h] is applied to ROM 12. In conjunction therewith, the CE bar and the OE bar become effective. Then, the data 57[h] stored in the address 0000[h] is output when ROM 12 is mounted. It should be noted that the buffer 34 is inserted so that interference of the signal of the external data bus DB and the output of ROM 12 may not be caused.

Figures 6, 7:
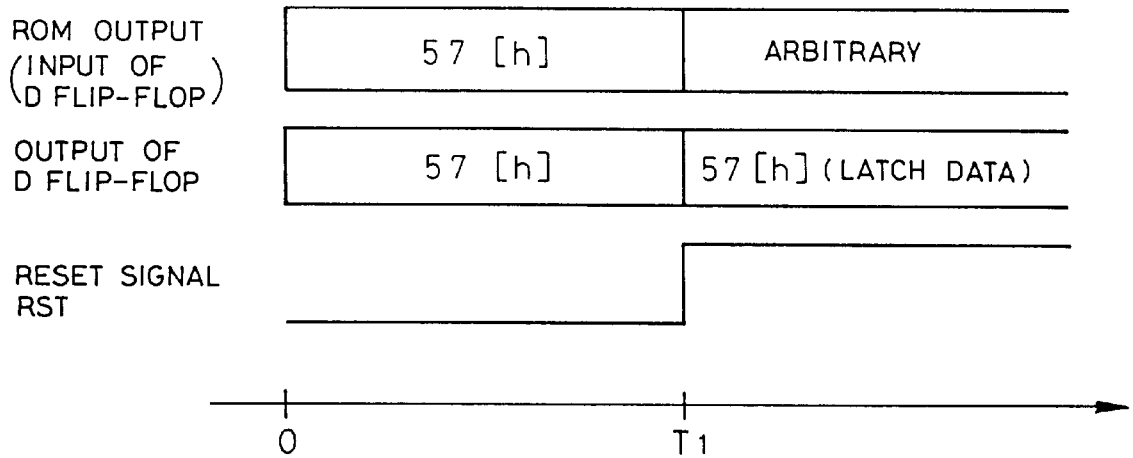
FIG. 6 is an illustration showing an operation of a D-type flip-flop in FIG. 3.
FIG. 7 is a timing chart showing an operation of the memory mounting judgment circuit of FIG. 3.

Here, the D-type flip-flop (hereinafter abbreviated as DFF) 37 performs latching operation as shown in FIG. 6. Therefore, when the reset signal is varied from "0" to "1", the DFF 37 latches the data 57[h] of the address 0000[h].

On the other hand, when ROM is not mounted, all data bus appears to be "1" by the pull-up resistor of the pull-up portion 35. Therefore, when the reset signal is varied from "0" to "1", the DFF 37 latches FF[h]. Accordingly, judgment whether ROM 12 is mounted or not, can be made depending upon whether the data latched by the DFF 37 is FF[h].

In FIG. 7, variation data on the data bus when ROM 12 is mounted, is shown. In FIG. 7, when the reset signal RST becomes "0" by turning ON of the power source, 00[h] is applied to ROM 12 as address. Therefore, 57[h] is output as data from ROM 12.

On the other hand, when the reset signal RST is varied from "0" to "1" at a timing T1, 57[h] is latched in DFF 37. On the other hand, address by the address bus is applied to ROM 12 so that arbitrary data is output.

Figure 8:
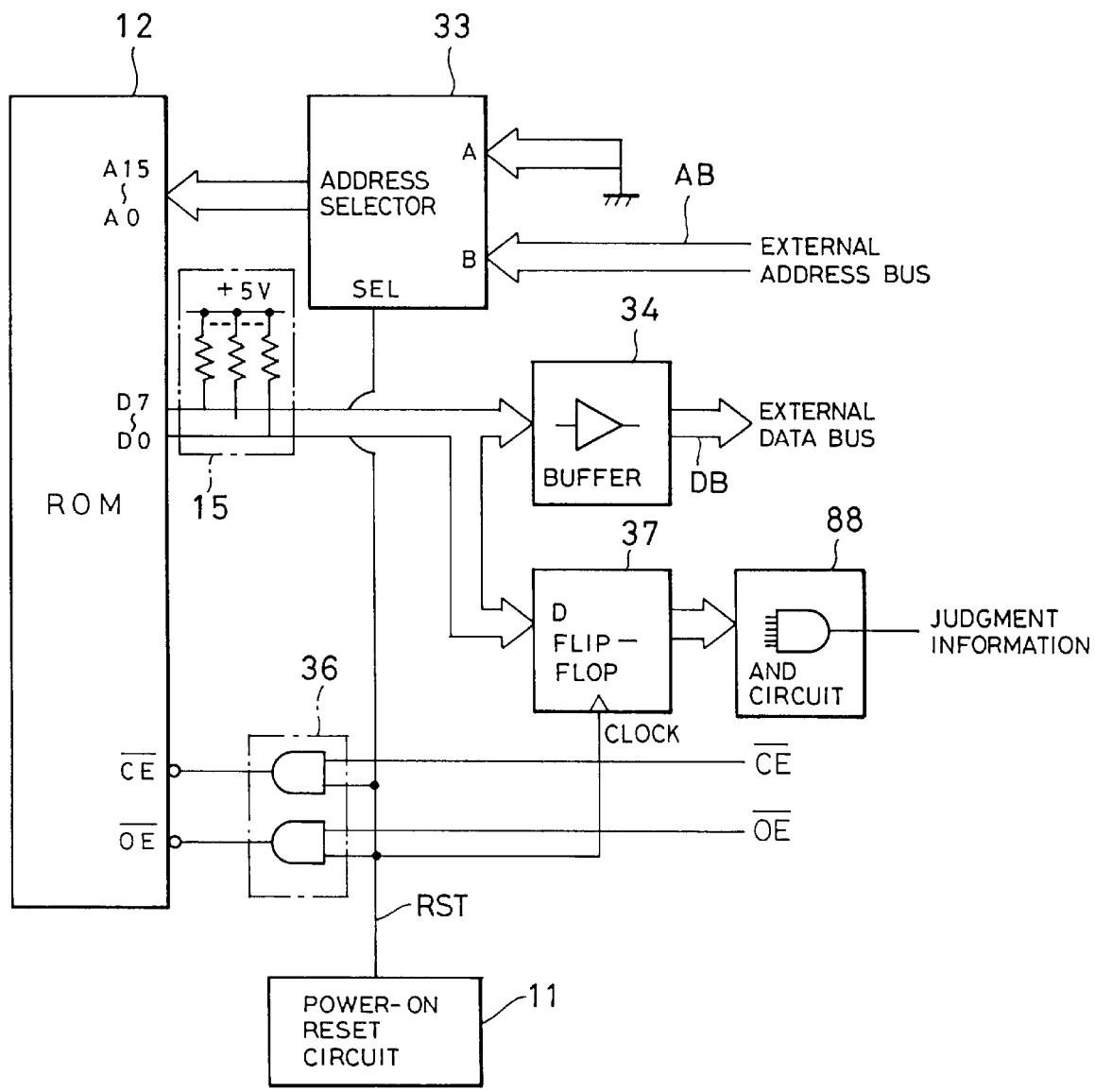
FIG. 8 is a block diagram showing a construction of another particular embodiment a memory mounting judgment circuit according to the present invention.

Next, a particular construction of the circuit shown in FIG. 2 is illustrated in FIG. 8. The circuit shown in FIG. 8 is constructed by adding an AND circuit 88 to the construction shown in FIG. 3. The premises and constructions other than that set forth above are the same as that shown in FIG. 3. The discussion therefor is neglected for simplification of the disclosure to facilitate clear understanding of the invention.

In FIG. 8, the latch output when ROM 12 is mounted is 57[h], therefore an output after AND operation in the AND circuit becomes "0". On the other hand, the latch output when ROM 12 is not mounted is FF[h], therefore the output after AND operation in the AND circuit becomes "1". Accordingly, by the output of the AND circuit 88, judgement whether ROM 12 is mounted or not, can be made.

Figure 9:
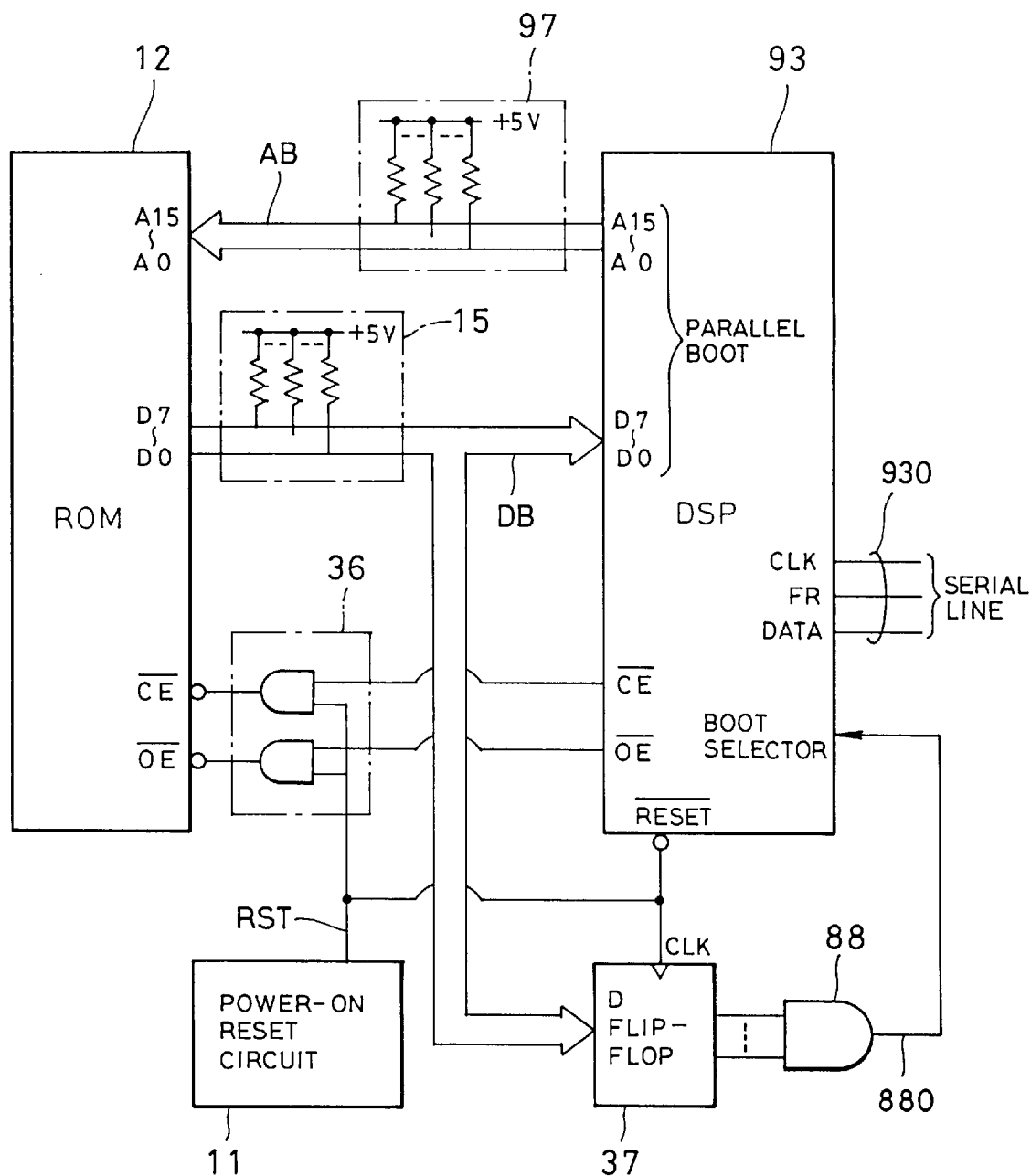
FIG. 9 is an illustration showing one modification of a memory mounting judgment circuit according to the present invention.

Next, two applications of the shown circuit will be discussed. FIG. 9 shows the first application. In FIG. 9, the construction shown in FIG. 8 is applied to DSP (Digital Signal Processor) which has a function to switch between parallel boot and serial boot depending upon a state of a selector signal immediately after resetting.

In FIG. 9, ROM 12 is provided for boot operation of a DSP 93. In the most significant address FFFF[h] of ROM 12, a special value (not FF[h]) called as boot word which cannot be arbitrarily re-written by a user, is written. In the shown embodiment, the boot word is assumed to be A4[h].

On the other hand, when the reset signal RST is input, both of the address bus and the data bus of the DSP 93 become a high impedance state. Immediately after releasing of reset, the DSP 93 is started up by either one of ROM 12 or a serial line 930 depending upon the state of a boot selector signal 880. Here, when the selector signal 880 is "0", the parallel boot by the external ROM 12 is selected, and when the selector signal is "1", the serial boot by the serial line 930 is selected. It should be noted while the actual DSP selects a system to by booted by a plurality of signal lines, the discussion herein is given with assumption that selection can be done by single signal line for simplification of disclosure.

On the other hand, a pull-up circuit 97 is added to be high impedance upon resetting to fix the address bus AB at "1". Other construction is similar to the case of FIG. 8.

In the construction set forth above, when ROM 12 is mounted, the output of the DFF 37 during reset operation and after reset operation is A4[h]. Therefore, the boot selector signal 880 becomes "0". Thus, after reset operation, parallel boot by the mounted ROM 12 is performed.

On the other hand, when ROM 12 is not mounted, the output of the DFF 37 is FF[h]. Therefore, the boot selector signal 880 becomes "1". Accordingly, after resetting operation, serial boot is performed by the serial line 903 including respective signal lines of a clock CLK, a frame FR and a data DATA, is performed. Even when the serial ROM is provided in place of the serial line 930, serial boot is performed.

Figure 10:
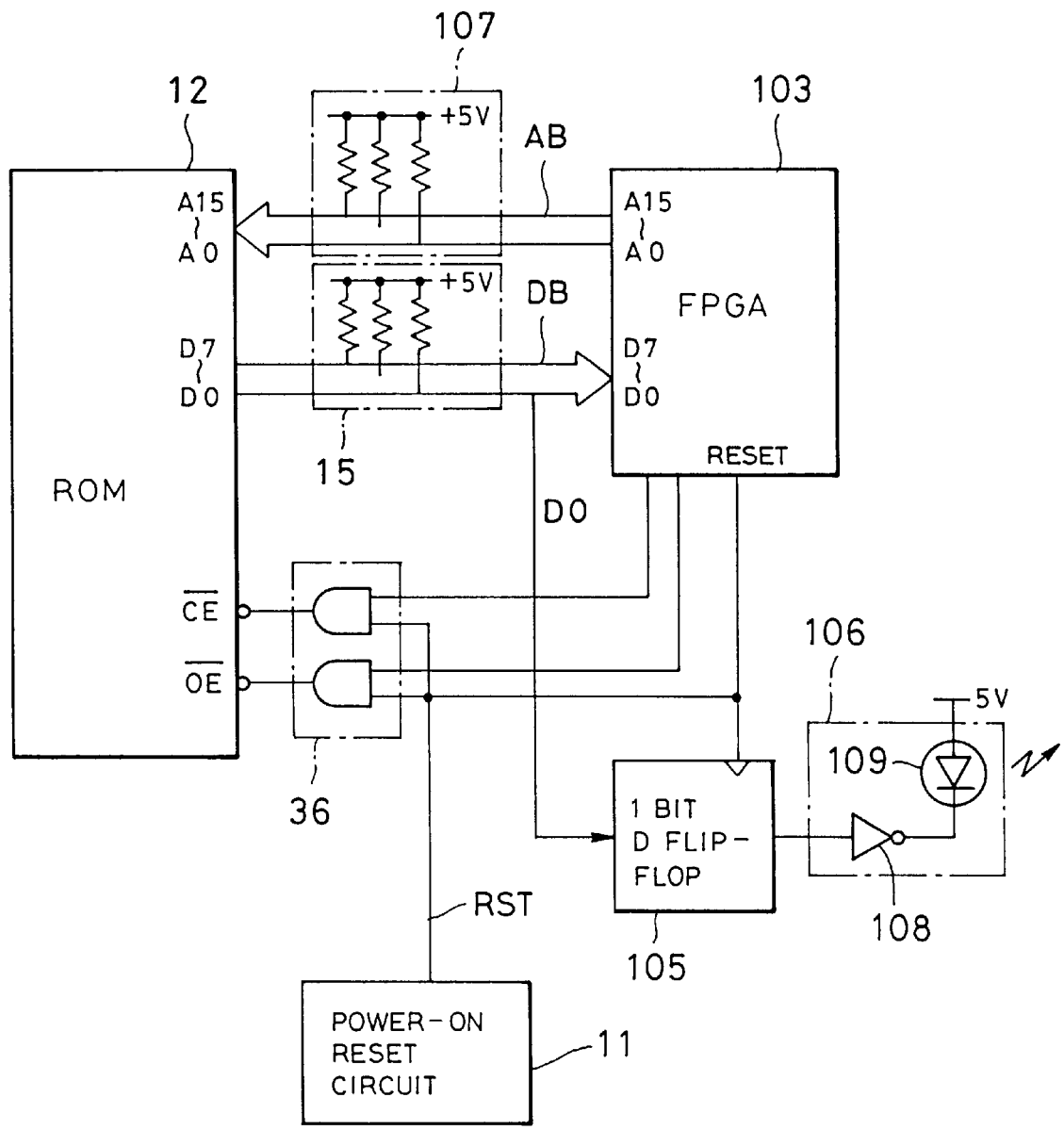
FIG. 10 is an illustration showing another modification of a memory mounting judgment circuit according to the present invention.
Figure 11:
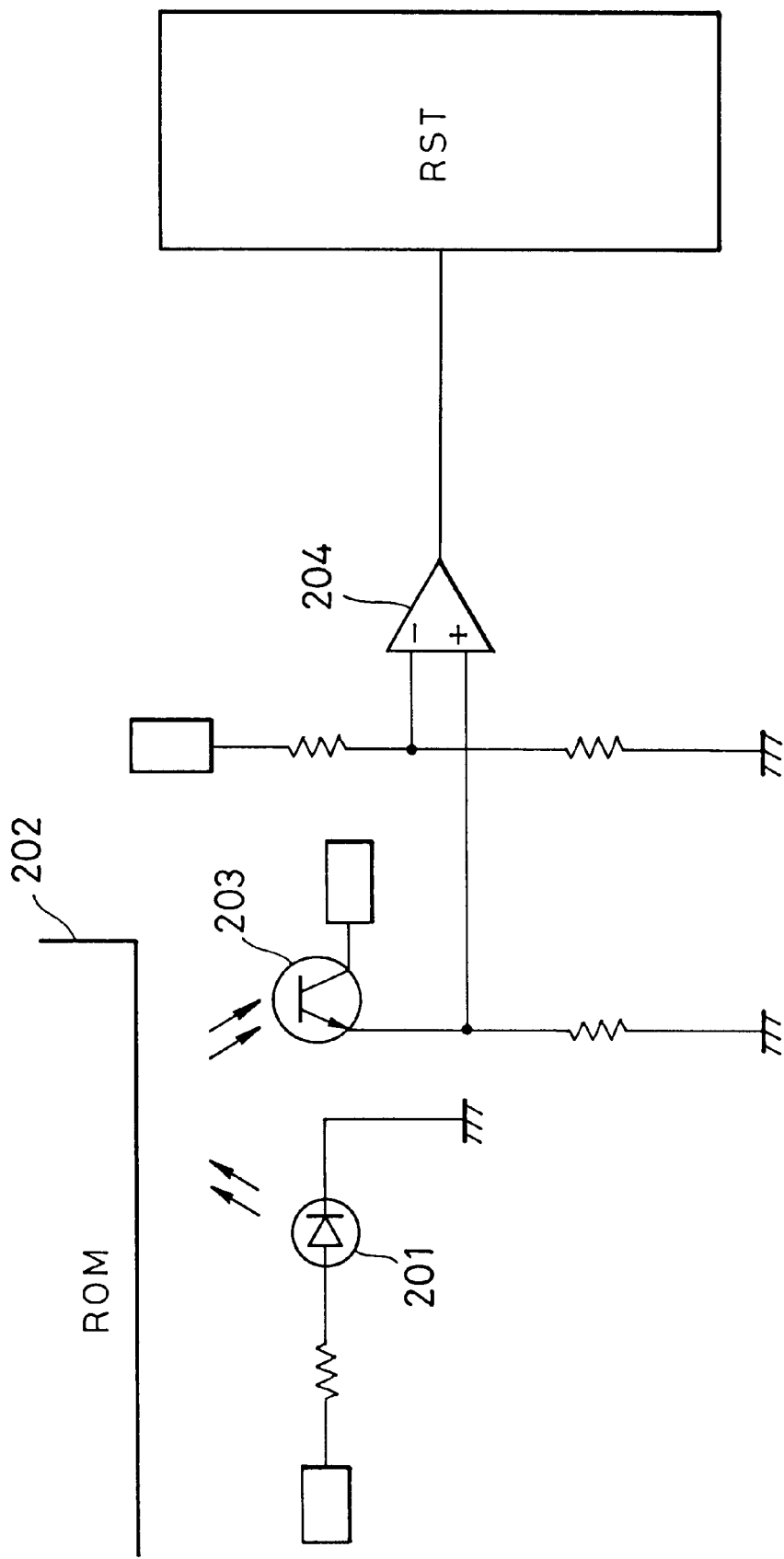
FIG. 11 is a block diagram showing a construction of the conventional memory mounting judgment circuit.
Figure 12:
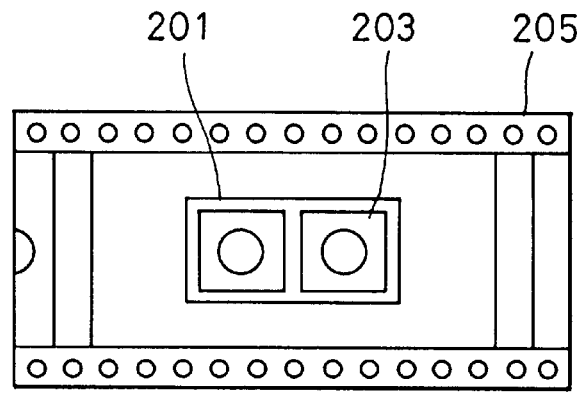
FIG. 12 is an illustration showing a construction in the vicinity of a socket for ROM in the memory mounting judgment circuit of FIG. 11.
Figure 13:
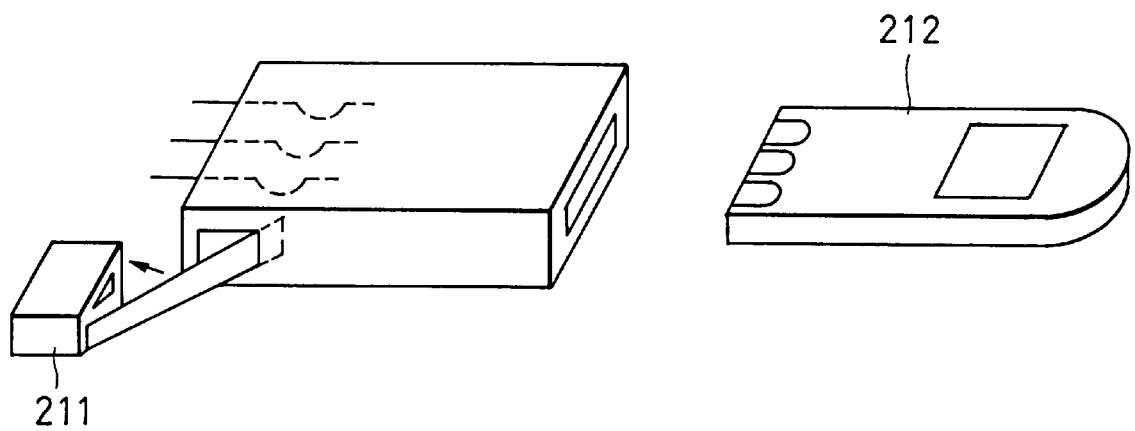
FIG. 13 is an illustration showing one prior art of a construction detecting presence or absence of an IC card.
Figure 14:
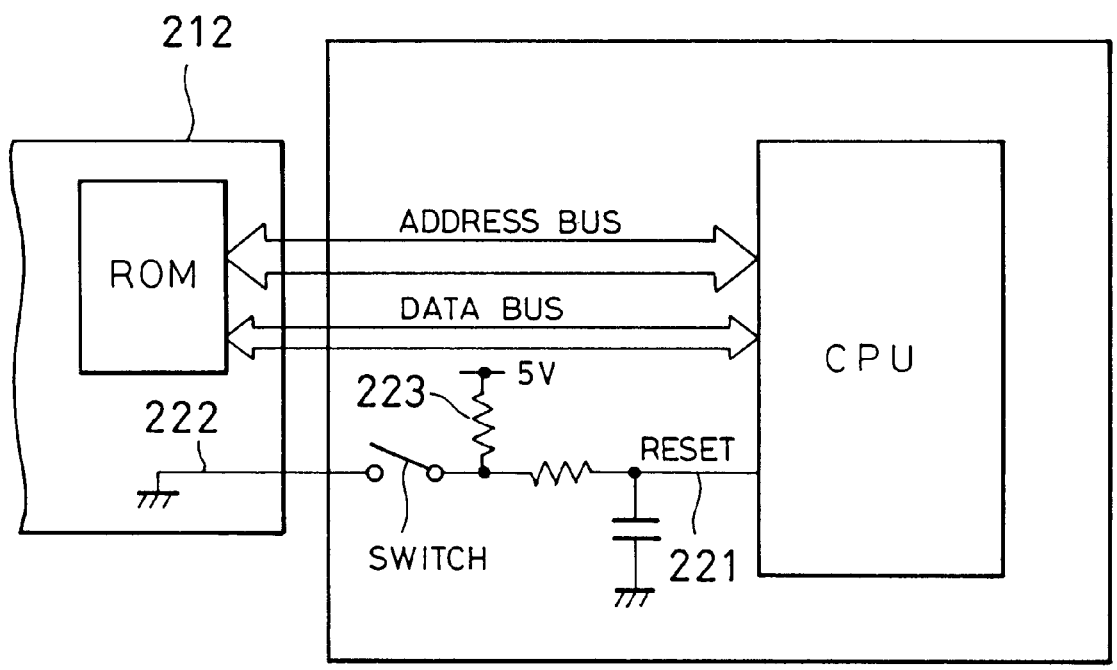
FIG. 14 is an illustration showing another prior art of a construction detecting presence or absence of an IC card.

FIG. 10 shows the second application, in which is shown a construction where the construction of FIG. 8 is applied to an FPGA (Field Programmable Gate Array).

In FIG. 10, the FPGA 103 reads data stored in RAM after resetting operation and is constructed to perform configuration in the FPGA circuit. In the condition where the reset signal RST is input to the FPGA 103, both of the address bus and the data bus become high impedance state. The data read by the FPGA 103 is address 0000[h] to 1000[h], and any data can be written in the address FFFF[h]. IN the shown example, "0" is written in all bit "0" (=00[h]).

The pull-up circuit 107 is added for fixing the address bus to "1" in the high impedance state upon resetting. On the other hand, a DFF 105 latches only D0 among the signal line of the data bus DB.

In the construction set forth above, when ROM 12 is mounted, 00[h] is output to the data bus DB during reset operation. Therefore, the output of the DFF 105 which latches only D0, becomes "0". On the other hand, when ROM 12 is not mounted, the output of the data bus DB is FF[h], the output of the DFF 105 becomes "1". By the signal output from the DFF 105, an LED circuit 106 is driven. In the LED circuit 106, an inverter 108 and a photo diode 109 driven by the output thereof are provided. Thus, a light from the photo diode 109 can be used as an alarm of mounting of ROM.

It should be appreciated that, in the shown application, when any data may be written in the data in the address selected during resetting operation, the shown circuit can be realized by one bit of the DFF.

On the other hand, it may be possible to provide an alarm by a buzzer despite of using the light of the photo diode as alarm.

As set forth above, the present invention can improve reliability of checking whether ROM is mounted in a logical circuit or not, in comparison with the prior art utilizing an optical sensor and a mechanical sensor. Also, constraint in arrangement can be resolved to permit reduction of size and weight of the circuit.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A memory mounting judgment circuit comprising:
   connecting means having an output terminal electrically connected with a data terminal of a memory when said memory is mounted;
   storage means responsive to an external start-up command for storing a signal as a storage content from said output terminal;
   logic fixing means for fixing a logical level of a signal line electrically connecting said output terminal and said storage means at a specific logical level when said memory is not mounted,
   the storage content of said storage means allowing a judgment to be made as to whether said memory is connected to said connecting means, the judgment being made depending upon the storage content of said storage means.

2. A memory mounting judgment circuit as set forth in claim 1, wherein said logic fixing means includes a pull-up resistor connected to said signal line and pulling up said signal line.

3. A memory mounting judgment circuit comprising:

connecting means having an output terminal electrically connected with a data terminal of a memory when said memory is mounted;

storage means responsive to an external command for storing a signal as a storage content from said output terminal;

logic fixing means for fixing a logical level of a signal line electrically connecting said output terminal and said storage means at a specific logical level when said memory is not mounted, the storage content of said storage means allowing a judgment to be made as to whether said memory is connected to said connecting means, the judgment being made depending upon the storage content of said storage means;

wherein said external command is a reset signal fed in response to a power source ON command.

4. A memory mounting judgment circuit comprising:

connecting means having an output terminal electrically connected with a data terminal of a memory when said memory is mounted;

storage means responsive to an external command for storing a signal as a storage content from said output terminal;

logic fixing means for fixing a logical level of a signal line electrically connecting said output terminal and said storage means at a specific logical level when said memory is not mounted, the storage content of said storage means allowing a judgment to be made as to whether said memory is connected to said connecting means, the judgment being made depending upon the storage content of said storage means;

wherein said logic fixing means sets logical levels of all of said signal lines at "1", judgment that said memory is not mounted, is made when storage content of said storage means are all "1", and judgment that said memory is mounted, is made when storage content of said storage means is not all "1".

5. A memory mounting judgment circuit as set forth in claim 4, wherein said logic fixing means includes a pull-up resistor connected to said signal line and pulling up said signal line.

6. A memory mounting judgment circuit as set forth in claim 4, wherein said external command is a reset signal fed in response to a power source ON command.

7. A memory mounting judgment circuit as set forth in claim 4, wherein an output of said storage means is lead by a plurality of signal lines, and an AND circuit outputting an AND of logical levels of a plurality signal lines, is included.

8. A memory mounting judgment circuit comprising:

a device having first and second start-up terminals and being started up by a start-up signal input to one of said start-up terminals;

connecting means electrically connected to said first start-up terminal and mounting a memory providing data applying said start-up signal to said device upon turning ON of the power source; and a pull-up resistor fixing a logical level of a signal line transmitting data read out from said memory to said device, at a predetermined logical level, a value of the logical level of the signal line allowing detection whether said memory is mounted or not to be performed depending upon the value of the logical sign level of said signal line upon starting-up of said device.

9. A memory mounting judgment circuit comprising:

a device having first and second start-up terminals and being started up by a start-up signal input to one of said start-up terminals;

connecting means electrically connected to said first start-up terminal and mounting a memory providing data applying said start-up signal to said device upon turning ON of the power source; and a pull-up resistor fixing a logical level of a signal line transmitting data read out from said memory to said device, at a predetermined logical level, a value of the logical level of the signal line allowing detection whether said memory is mounted or not to be performed depending upon the value of the logical level of said signal line upon starting-up of said device, wherein said device is a digital signal processor, said first start-up terminal is a parallel boot terminal, and said second start-up terminal is a serial boot terminal.

10. A memory mounting judgment circuit comprising:

a device started up by a start-up signal input at start-up terminals;

connecting means electrically connected to said start-up terminal and mounting a memory providing data applying said start-up signal to said device upon turning ON of the power source;

a pull-up resistor fixing a logical level of a signal line transmitting data read out from said memory to said device, at a predetermined logical level; and notifying means providing notice notifying the logical level of said signal line upon starting up of said device, a content of the notice allowing detection whether said memory is mounted or not to be performed depending upon the content of the notice of said notifying means.

11. A memory mounting judgment circuit comprising:

a device started up by a start-up signal input at start-up terminals;

connecting means electrically connected to said start-up terminal and mounting a memory providing data applying said start-up signal to said device upon turning ON of the power source;

a pull-up resistor fixing a logical level of a signal line transmitting data read out from said memory to said device, at a predetermined logical level; and notifying means providing notice notifying the logical level of said signal line upon starting up of said device, a content of the notice allowing detection whether said memory is mounted or not to be performed depending upon the content of the notice of said notifying means, wherein said notifying means is a photodiode emitting a light depending upon the logical level of said signal line.

12. A memory mounting judgment circuit comprising:

a device started up by a start-up signal input at start-up terminals;

connecting means electrically connected to said start-up terminal and mounting a memory providing data applying said start-up signal to said device upon turning ON of the power source;

a pull-up resistor fixing a logical level of a signal line transmitting data read out from said memory to said device, at a predetermined logical level; and notifying means providing notice notifying the logical level of said signal line upon starting up of said device, a content of the notice allowing detection whether said memory is mounted or not to be performed depending upon the content of the notice of said notifying means, wherein said notifying means is a buzzer to be actuated depending upon the logical level of said signal line.

13. A memory mounting judgment circuit comprising:

a device started up by a start-up signal input at start-up terminals;

connecting means electrically connected to said start-up terminal and mounting a memory providing data applying said start-up signal to said device upon turning ON of the power source;

a pull-up resistor fixing a logical level of a signal line transmitting data read out from said memory to said device, at a predetermined logical level; and notifying means providing notice notifying the logical level of said signal line upon starting up of said device, a content of the notice allowing detection whether said memory is mounted or not to be performed depending upon the content of the notice of said notifying means, wherein said device is a field programmable gate array.

* * * * *